United States Patent
Dai

(10) Patent No.: US 8,898,126 B1
(45) Date of Patent: Nov. 25, 2014

(54) METHOD AND APPARATUS FOR PROVIDING CONCURRENT DATA INSERTION AND UPDATING

(75) Inventor: Qiang Dai, Vienna, VA (US)

(73) Assignee: EMC Corporation, Hopkinton, MA (US)

(*) Notice: Subject to any disclaimer, the term of this patent is extended or adjusted under 35 U.S.C. 154(b) by 128 days.

(21) Appl. No.: 11/732,664

(22) Filed: Apr. 4, 2007

(51) Int. Cl.
 G06F 7/00 (2006.01)
 G06F 17/00 (2006.01)

(52) U.S. Cl.
 USPC ............................................. 707/703

(58) Field of Classification Search
 None
 See application file for complete search history.

(56) References Cited

U.S. PATENT DOCUMENTS

| | | | |
|---|---|---|---|
| 6,233,585 B1* | 5/2001 | Gupta et al. | 707/103 R |
| 6,978,305 B1* | 12/2005 | Nainani et al. | 709/225 |
| 7,117,172 B1* | 10/2006 | Black | 705/35 |
| 7,392,210 B1* | 6/2008 | MacKay et al. | 705/35 |
| 2002/0111929 A1* | 8/2002 | Pudipeddi et al. | 707/1 |
| 2002/0133507 A1* | 9/2002 | Holenstein et al. | 707/200 |
| 2002/0138483 A1* | 9/2002 | Bretl et al. | 707/8 |
| 2004/0068501 A1* | 4/2004 | McGoveran | 707/8 |
| 2004/0267807 A1* | 12/2004 | Barabas et al. | 707/103 R |
| 2006/0123070 A1* | 6/2006 | Hickson | 707/205 |

* cited by examiner

*Primary Examiner* — Usmaan Saeed
*Assistant Examiner* — Michele Choi
(74) *Attorney, Agent, or Firm* — Krishnendu Gupta; Joseph D'Angelo

(57) ABSTRACT

A method, computer program product and apparatus for providing a scheduling mechanism for inserting/updating data items in a database including obtaining each of the at least one keys included within a selected data item, determining whether each of the at least one keys is suitable for processing and storing each of the at least one keys in a first queue when each of the keys is available for processing, otherwise storing the keys in a second queue.

21 Claims, 3 Drawing Sheets

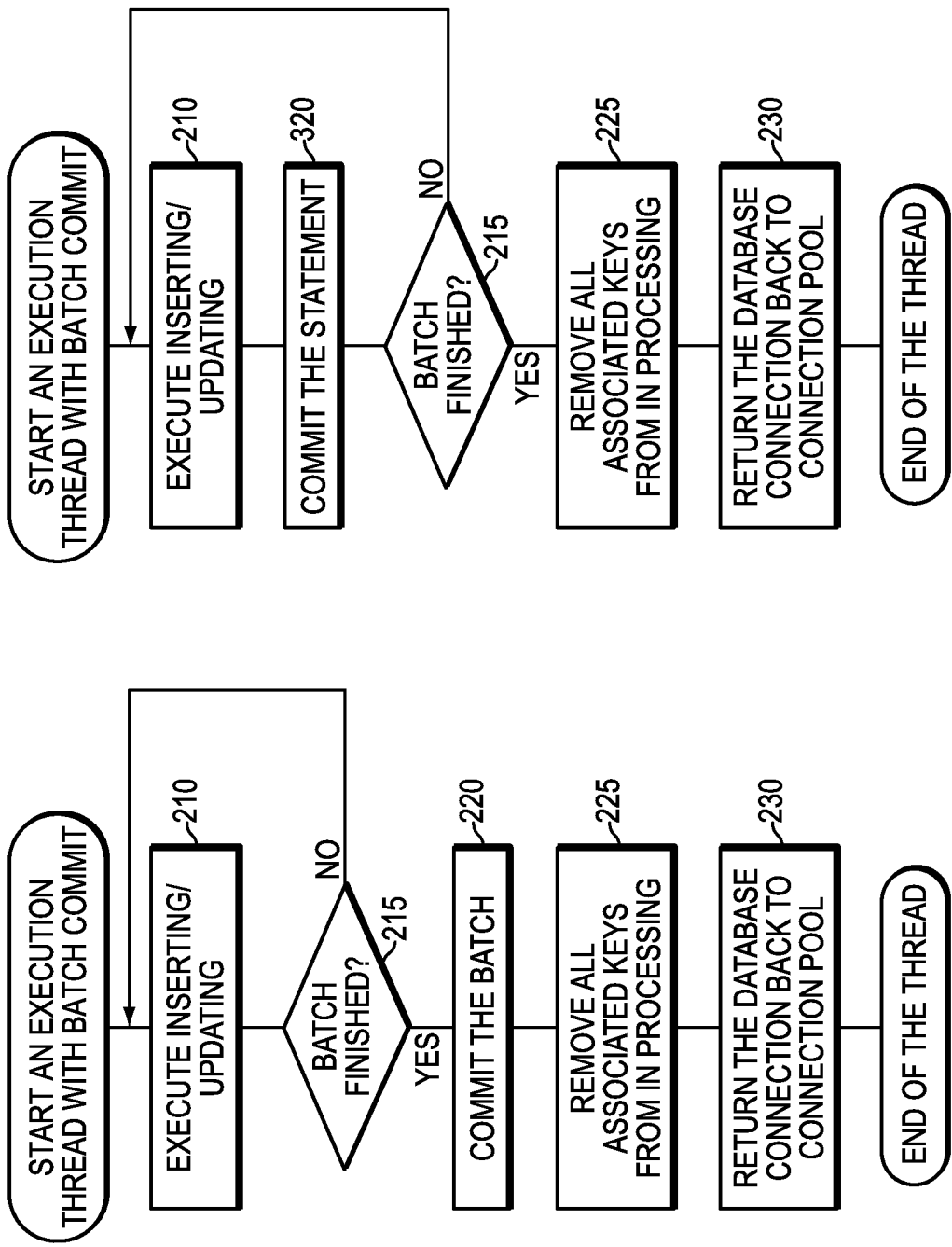

METHOD AND APPARATUS FOR PROVIDING CONCURRENT DATA INSERTION AND UPDATING

FIELD OF THE INVENTION

The invention relates generally to database management, and more specifically a method and apparatus for providing improved database updating.

BACKGROUND OF THE INVENTION

Timely updating and/or inserting data into a database is a critical function particularly, when data may be lost due to equipment failure. For example, in financial transactions, the recording of transactions, such as buying and selling stocks, may incur significant financial penalties if a transaction is lost or not properly recorded.

In the conventional database technology, there are a number of ways to insert and/or update (insert/update) data into database programmatically.

1) Single database connection with auto-commit turn on. In this case, inserting/updating data into database is executed in a sequential way and each inserting/updating operation is committed into the database before a next inserting/updating request being sent. The performance of inserting/updating in this case is limited by the network delay, database side JO (input/output) of each inserting/updating request.

2) Single database connection with batch commit mode. In this case, inserting/updating data into database is executed in a sequential way. However, multiple inserting/updating may be combined together before being committed. The database side JO number is reduced and the performance is better than the single database connection described above. However, each batch still needs to wait to be sent until the finish of the previous batch transaction.

3) Concurrent inserting/updating with multiple database connections or connection pool. In this case, database side will allocate resources to handle inserting/updating for each connection. However, it is up to the client side to schedule the inserting/updating transactions that not only take the advantage of multiple connections to improve the inserting/updating performance, but also to make sure that the inserting/updating data are committed efficiently and correctly.

There are also two sub-cases when using multiple database connections for inserting/updating data into the database.

a) With database auto-commit turn on. In this case, each connection is performed in a manner similar to that described with regard to the single database connection. The performance improvement is substantially proportional to the number of connections. However, there is an issue with regard to scheduling the transactions sequentially to each connection, which could lead to incorrect data being committed. Assuming that there are two transactions A1, A2 to modify the same records in database. A schedule could set A1 in connection 1 and A2 in connection 2. Since there is no guarantee that A1 will reach the database side first, the database side could have first modified the database record first with A2 then A1 and lead to incorrect data by overwritten.

b) With batch commit mode. In this case, each connection is performed in a manner similar to Single database connection with batch commit mode described above. The performance improvement, in this case, is dependent upon the connection number by combining requests in a batch transaction. However, there will be two issues needed to be solved in scheduling batch transactions in multiple connections. One issue is the scheduling issue as previously described (see "a" above). While the other issue is a possible dead lock that could block all connections For example, requests A1 . . . B1 . . . C1 . . . B2 . . . C2 . . . A2 are made to modify database records A, B and C. A sequential schedule could put A1 . . . B2 in connection 1, B1 . . . C2 in connection 2 and C1 . . . A2 in connection 3. When they are sent to database side for execution, connection 1 could finish execute A1 but be blocked at B2 waiting for connection 2 to commit B1 first while connection 2 is blocked at C2 waiting for connection 3 to commit C1 and connection 3 is again blocked at A2 waiting connection 1 to commit A1.

In an exemplary program for database management, the EMC Corporation Smarts SDI (SQL DATABASE INTERFACE) adapter uses the Single Connection and Single Connection with batch mode methods for inserting/updating data into database.

However, practice has showed that the performance is less than optimal in that delays in inserting/updating may occur. Hence, there is a need in the industry for a method and apparatus for reducing delay time in updating and/or inserting data into a database to provide an increase in data flow and throughput.

SUMMARY OF THE INVENTION

A method, computer program product, and apparatus for providing a scheduling mechanism for inserting/updating data items in a database including obtaining each of the at least one keys included within a selected data item, determining whether each of the at least one keys is suitable for processing: and storing each of the at least one keys in a first queue when each of the keys is available for processing, otherwise storing the keys in a second queue.

DETAILED DESCRIPTION OF THE FIGURES

FIG. 2 illustrates a flow chart of an exemplary process for processing batch requests in accordance with the principles of the invention;

FIG. 3 illustrates a flow chart of a second exemplary process for processing batch requests in accordance with the principles of the invention.

Figure 1:
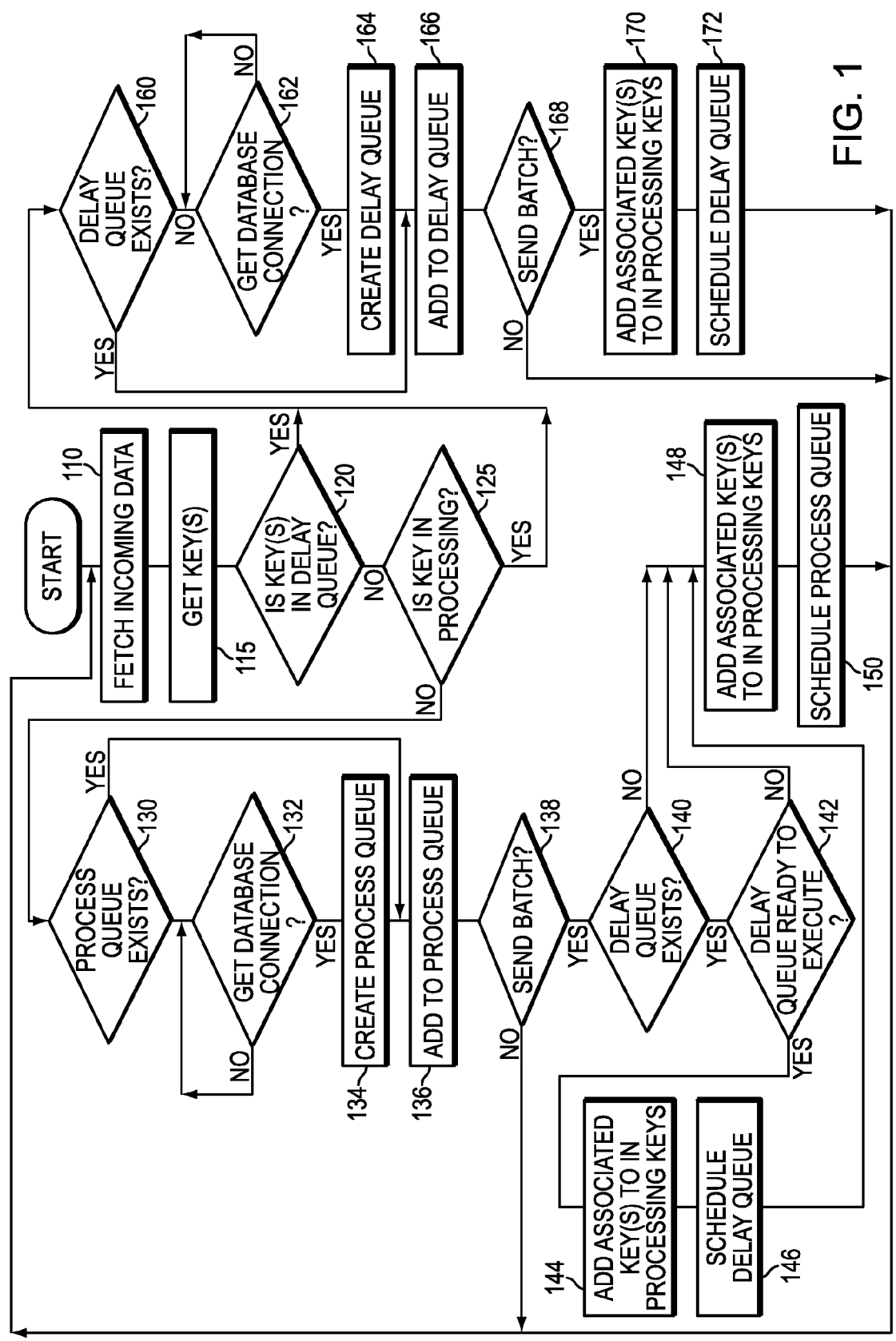
FIG. 1 illustrates a flow chart of an exemplary process in accordance with the principles of the present invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1 illustrates an exemplary process for managing the insertion and updating database information in accordance with the principles of the invention. In this illustrative process, data to be stored in a database is received at block 110. The data typically includes information regarding the data to be stored and a "key" or access code under which the data is to be stored. The key or access code can be a database table primary key or a value that can be mapped to database table primary key(s). Each key defines a unique set of data in the database side. There is no overlap for the data stored in the database among different keys. For example, in a typical company, employee medical records, payment records, benefit records, performance records, etc., may be stored in a database wherein medical records may be stored using a key that identifies the employee supplemented by a medical record key. Similarly payroll records may be stored using a key that identifies the employee supplemented by a payroll key. In this case, access to specific information of employees may be limited by individual functions.

At block 115 the key associated with the data is obtained. At block 120, a determination is made whether the obtained key is contained in a delay queue. If the answer is in the affirmative, processing continues to block 160 wherein process to add the data in a delay queue is preformed. In this exemplary process, a determination is made at block 160 whether a delay queue exists.

If the answer is negative, then a determination is made, at block 162, as to whether a database connection has been obtained. If the answer is negative, the processing continues to wait until a connection has been obtained. When it is determined that a connection has been obtained, a delay queue is created at block 164. The data is then added to the delay queue at block 166 and processing continues to block 168.

Returning to the determination at block 160, if the answer is in the affirmative, then the input data is added to a delay queue at block 166 and processing continues to block 168.

At block 168, a determination is made whether current batch data is to be sent. If the answer is in the affirmative, then the keys associated with the delay queue are added into "In-process" key store at block 170 and the delay queue is scheduled for processing 172.

However, if the answer is negative, then processing continues to block 110 to obtain the next incoming data value.

Returning to the determination at block 120, if the answer is negative, then a determination is made, at block 125, whether the obtained key is being processed. If the answer is in the affirmative, then processing continues to block 160, to place the key and the associated data on a delay queue, as previously described.

However, if the answer is negative, then a determination is made at block 130, whether a process queue exists. If the answer is negative, then a database connection is obtained at block 132. Processing waits at block 132 until a data connection is obtained. At block 134, a process queue is created and at block 136, the data is added to the process queue. Processing continues to block 138.

Returning to the determination at block 130, if the process queue is determined to exist, then the data is added to the process queue at block 136 and processing continues to block 138.

At block 138, a determination is made whether a batch of data is to be sent. If the answer is in the affirmative, then a determination is made whether a delay queue exists, at block 140. If a delay queue is found to exist, then a determination is made whether the delay queue is ready to be processed, at block 142. If the delay queue is ready to be processed, then the keys stored in the delay queue are added into "In-process" key store at block 144 and the delay queue is scheduled for processing at block 146.

Processing continues to block 148, where the keys associated with the process queue are added into "In-process" key store and the process queue is scheduled at block 150. Processing returns to block 110 to obtain the next data item.

Returning to the determinations at blocks 140 and 142, if the answer to either question presented is negative, then processing continues to block 148 where the keys associated with the process queue are added into "In-process" key store and the process queue is scheduled at block 150.

FIG. 2 illustrates an exemplary process for processing a batch request in accordance with the principles of the invention. In this case, a queue (either delay queue and/or process queue) is selected for execution of inserting/updating in a thread or sub process. All the key(s) associated with the queue were already added into "In-process" key store. In this exemplary process, a data item is inserted or updated in the database at block 210. At block 215, a determination is made whether all data associated with the batch request have been processed. If the answer is negative, then processing continues at block 210 until all the batched data is processed.

However, if the answer is in the affirmative, then the batch request is committed at block 220 and after the commitment of the batch request, all the associated keys are removed from the "In-process" key store at block 225 and the database connection associated with this queue is returned to the database connection pool at block 230. In this case, commitment refers to the finalizing of the inserting/updating data into database. In a batch request, there are a number of inserting/updatings. The database side will plan the inserting/updating in memory or disk log area when processing each inserting/updating. Until a user commits the batch, the data changed will not actually be written to the database storage.

FIG. 3 illustrates a second exemplary process for processing a batch request in accordance with the principles of the invention. In this exemplary process after each data item is inserted at block 210, the specific data item is auto committed at block 320. Processing continues in a manner similar to that described with regard to FIG. 2 and need not be repeated herein.

As would be recognized embodiments of the present application disclosed herein include software programs to implement the embodiment and operations disclosed herein. For example, a computer program product including a computer-readable medium encoded with computer program logic (software in a preferred embodiment). The logic is configured to allow a computer system to execute the functionality described above. One skilled in the art will recognize that the functionality described may also be loaded into conventional computer memory and executed by a conventional CPU. The implementations of this invention may take the form, at least partially, of program code (i.e., instructions) embodied in tangible media, such as floppy diskettes, CD-ROMs, hard drives, random access or read only-memory, or any other machine-readable storage medium or downloaded from one or more network connections. When the program code is loaded into and executed by a machine, such as a computer, the machine becomes an apparatus for practicing the invention. The implementations of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the functionality or processes described herein reconfigures a general purpose digital computer into a special purpose digital computer enabled for implementing the functionality discussed herein.

When implemented on a general-purpose processor, the program code combines with the processor of the computer to provide a unique apparatus that operates analogously to specific logic circuits.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to facilitate application deployment configuration.

Figure 4:
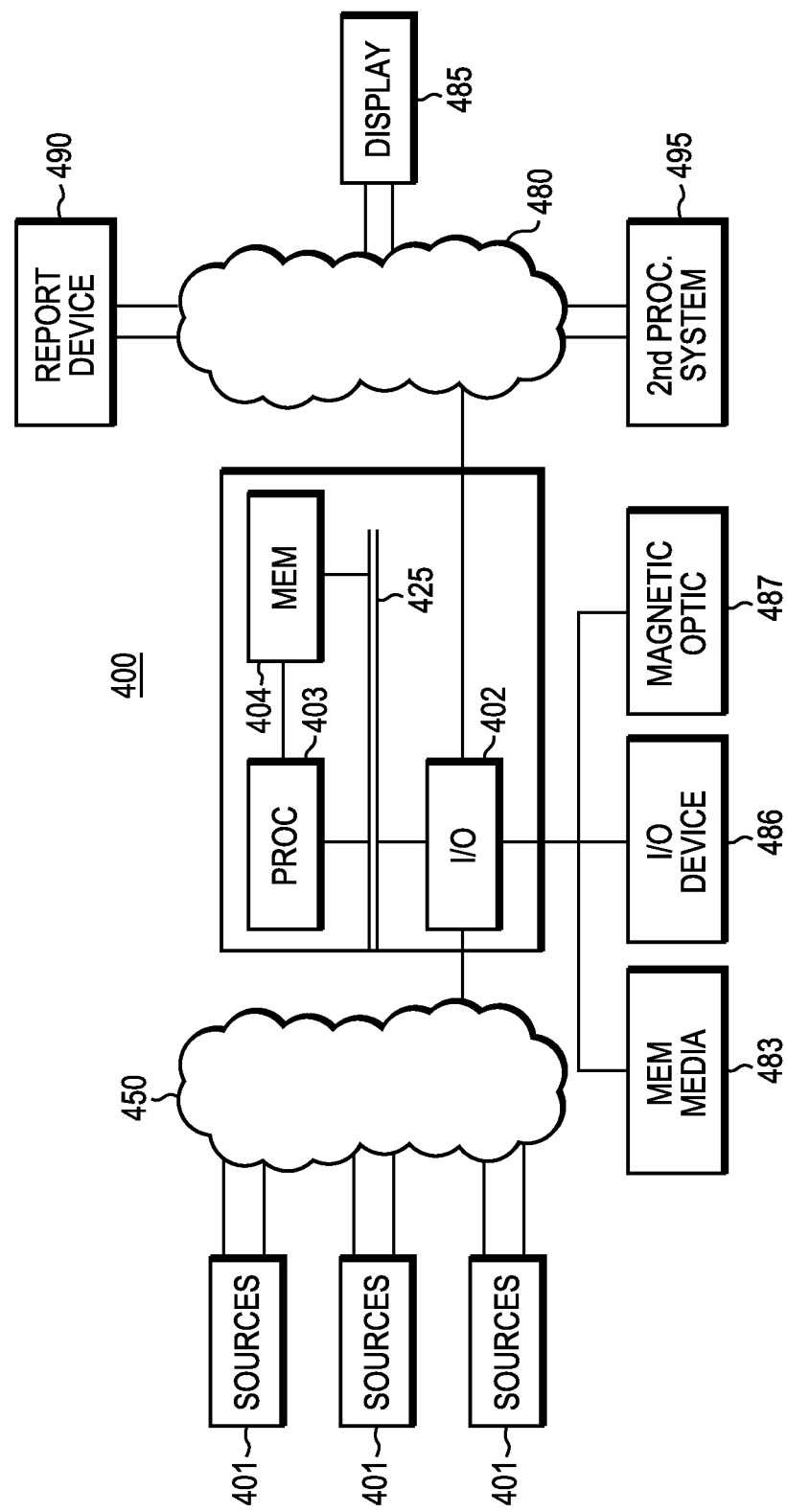
FIG. 4 illustrates a system implementing the processing shown herein.

FIG. 4 illustrates an exemplary embodiment of a system 400 that may be used for implementing the principles of the present invention. System 400 may contain one or more input/output devices 402, processors 403 and memories 404. I/O devices 402 may access or receive information from one or more devices 401, which represent sources of information. Sources or devices 401 may be devices such as routers, servers, computers, notebook computer, PDAs, cells phones or other devices suitable for transmitting and receiving information responsive to the processes shown herein. Devices 401 may have access over one or more network connections 450 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 402, processors 403 and memories 404 may communicate over a communication medium 425. Communication medium 425 may represent, for example, a bus, a communication network, one or more internal connections of a circuit, circuit card or other apparatus, as well as portions and combinations of these and other communication media. Input data from the sources or client devices 401 is processed in accordance with one or more programs that may be stored in memories 404 and executed by processors 403. Memories 404 may be any magnetic, optical or semiconductor medium that is loadable and retains information either permanently, e.g. PROM, or non-permanently, e.g., RAM. Processors 403 may be any means, such as general purpose or special purpose computing system, such as a laptop computer, desktop computer, a server, handheld computer, or may be a hardware configuration, such as dedicated logic circuit, or integrated circuit. Processors 403 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 404. The code may be read or downloaded from a memory medium 483, an I/O device 486 or magnetic or optical media 487, such as a floppy disk, a CD-ROM or a DVD, 8 and then stored in memory 404. Similarly the code may be downloaded over one or more networks, e.g., 450, 480, or not shown via I/O device 486, for example, for execution by processor 403 or stored in memory 404 and then accessed by processor 403. As would be appreciated, the code may be processor-dependent or processor-independent. JAVA is an example of processor-independent code. JAVA is a trademark of the Sun Microsystems, Inc., Santa Clara, Calif. USA.

Information from device 01 received by I/O device 402, after processing in accordance with one or more software programs operable to perform the functions illustrated herein, may also be transmitted over network 80 to one or more output devices represented as display 485, reporting device 490 or second processing system 495.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A computer-implemented method for updating and inserting data items into a database, wherein a processor executes the method comprising:

fetching data items, each of the data items comprising a key and information, wherein each key comprises a primary key for the respective data item;

obtaining each key of the keys of the data items;

determining whether each key of the keys is in a delay queue or is in processing, wherein each key in the delay queue is not available for updating in the database and is not available for committing in the database;

determining, based on a determination that at least one key of the keys is not in the delay queue and is not in processing, if a process queue exists and, based on a negative determination that the process queue exists, creating the process queue;

determining, based on a determination that at least one key of the keys is in the delay queue or is in processing, if the delay queue exists and, based on a negative determination that the delay queue exists, creating the delay queue;

for each key of the keys, storing the key of the keys in the process queue when the key of the keys is available for updating in the database or is available for committing in the database, otherwise storing the key of the keys in the delay queue;

scheduling an insert/update operation for the database including data items associated with keys in the process queue;

executing a batch commit to information of the data items associated with the keys in the process queue to the database; and removing the keys from the process queue associated with the information committed to the database.

2. The method as recited in claim 1, further comprising:

scheduling an insert/update operation including data items associated with the keys in said delay queue prior to data items in said process queue;

executing a batch commit to information of the data items associated with the keys in the delay queue to the database; and removing the keys from the delay queue associated with the information committed to the database.

3. The method as recited in claim 2, further comprising executing a second thread to perform the batch commit to the information of the data items associated with the keys in the delay queue.

4. The method as recited in claim 1, further comprising executing a thread to perform the batch commit to the information of the data items associated with the keys in the process queue.

5. The method as recited in claim 4, further comprising getting a database connection.

6. The method as recited in claim 5, further comprising returning the database connection back to a connection pool.

7. The computer implemented method of claim 1, wherein a key is not available for updating in the database and is not available for committing in the database if information corresponding to the key needs to be updated in the database or committed in the database sequentially after information associated with another key which has not been updated in the database and has not been committed in the database to ensure correct information is committed.

8. The computer implemented method of claim 1, further comprising:

determining if the delay queue is ready to execute; and scheduling the delay queue to be processed.

9. The computer implemented method of claim 1, wherein a key is not available for updating in the database and is not available for committing in the database when information corresponding to the key is not available for updating in the database and is not available for committing in the database.

10. An apparatus for updating and inserting data items into a database, the apparatus comprising:

a processor in communication with a memory, the processor executing logical code causing the processor to perform:

fetching data items, each of the data items comprising a key and information, wherein each key comprises a primary key for the respective data item;

obtaining each key of the keys of the data items;

determining whether each key of the keys is in a delay queue or is in processing, wherein each key in the delay queue is not available for updating in the database and is not available for committing in the database;

determining, based on a determination that at least one key of the keys is not in the delay queue and is not in processing, if a process queue exists and, based on a negative determination that the process queue exists, creating the process queue;

determining, based on a determination that at least one key of the keys is in the delay queue or is in processing, if the delay queue exists and, based on a negative determination that the delay queue exists, creating the delay queue;

for each key of the keys, storing the key of the keys in the process queue when the key of the keys is available for updating in the database or is available for committing in the database, otherwise storing the key of the keys in the delay queue;

scheduling an insert/update operation for the database including data items associated with keys in the process queue;

executing a batch commit to information of the data items associated with the keys in the process queue to the database; and removing the keys from the process queue associated with the information committed to the database.

11. The apparatus as recited in claim 10, the processor further executing logical code causing the processor to perform:

scheduling an insert/update operation including data items associated with the keys in said delay queue prior to data items in said process queue;

executing a batch commit to information of the data items associated with the keys in the delay queue to the database; and removing the keys from the delay queue associated with the information committed to the database.

12. The apparatus as recited in claim 11, further comprising executing a second thread to perform the batch commit to the information of the data items associated with the keys in the delay queue.

13. The apparatus as recited in claim 10, further comprising executing a thread to perform the batch commit to the information of the data items associated with the keys in the process queue.

14. The apparatus as recited in claim 13, further comprising getting a database connection.

15. The apparatus as recited in claim 14, further comprising returning the database connection back to a connection pool.

16. A computer program product, stored on a non-transitory computer readable storage medium, for updates and inserts of data items into a database, the product providing logical code causing a processor to execute:

fetching data items, each of the data items comprising a key and information, wherein each key comprises a primary key for the respective data item;

obtaining each key of the keys of the data items;

determining whether each key of the keys is in a delay queue or is in processing, wherein each key in the delay queue is not available for updating in the database and is not available for committing in the database;

determining, based on a determination that at least one key of the keys is not in the delay queue and is not in processing, if a process queue exists and, based on a negative determination that the process queue exists, creating the process queue;

determining, based on a determination that at least one key of the keys is in the delay queue or is in processing, if the delay queue exists and, based on a negative determination that the delay queue exists, creating the delay queue;

for each key of the keys, storing the key of the keys in the process queue when the key of the keys is available for updating in the database or is available committing in the database, otherwise storing the key of the keys in the delay queue;

scheduling an insert/update operation for the database including data items associated with keys in the process queue;

executing a batch commit to information of the data items associated with the keys in the process queue to the database; and removing the keys from the process queue associated with the information committed to the database.

17. The product as recited in claim 16, providing further code to the processor for causing the processor to execute:
scheduling an insert/update operation including data items associated with the keys in said delay queue prior to data items in said process queue;
executing a batch commit to information of the data items associated with the keys in the delay queue to the database; and
removing the keys from the delay queue associated with the information committed to the database.

18. The product as recited in claim 17, further comprising executing a second thread to perform the batch commit to the information of the data items associated with the keys in the delay queue.

19. The product as recited in claim 16, further comprising executing a thread to perform the batch commit to the information of the data items associated with the keys in the process queue.

20. The product as recited in claim 19, further comprising getting a database connection.

21. The product as recited in claim 20, further comprising returning the database connection back to a connection pool.

* * * * *